United States Patent
Green et al.

(10) Patent No.: US 11,271,968 B2
(45) Date of Patent: Mar. 8, 2022

(54) ZERO ROUND TRIP TIME TRANSMISSION FOR ANTICIPATORY REQUEST MESSAGES

(71) Applicant: International Business Machines Corporation, Armonk, NY (US)

(72) Inventors: Matthew Green, Ashmore (AU); Narayana Aditya Madineni, Southport (AU); Michael W. Gray, Guanaba (AU); Luvita Burgess, Queensland (AU)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 16/809,234

(22) Filed: Mar. 4, 2020

(65) Prior Publication Data
US 2021/0281607 A1 Sep. 9, 2021

(51) Int. Cl.
*H04L 29/06* (2006.01)

(52) U.S. Cl.
CPC ........ *H04L 63/166* (2013.01); *H04L 63/0281* (2013.01); *H04L 63/0428* (2013.01); *H04L 63/061* (2013.01); *H04L 63/0823* (2013.01)

(58) Field of Classification Search
CPC ............... H04L 63/166; H04L 63/0281; H04L 63/0823; H04L 63/061; H04L 63/0428
See application file for complete search history.

(56) References Cited

U.S. PATENT DOCUMENTS

| | | | |
|---|---|---|---|
| 6,336,135 B1 | 1/2002 | Niblett et al. | |
| 6,993,591 B1* | 1/2006 | Klemm | H04L 67/2847 707/999.002 |
| 2006/0233376 A1* | 10/2006 | Forsberg | H04W 12/02 380/277 |
| 2012/0020331 A1* | 1/2012 | Chin | H04W 76/28 370/335 |

(Continued)

FOREIGN PATENT DOCUMENTS

JP 4755590 B2 8/2011

OTHER PUBLICATIONS

Van Rijn, R., "Whats new with TLS 1.3," Medium, Dec. 6, 2018, 8 pages. https://medium.com/@vanrijn/what-is-new-with-tls-1-3-e991df2caaac.

(Continued)

*Primary Examiner* — Michael R Vaughan
(74) *Attorney, Agent, or Firm* — Jorge R. Maranto (57) ABSTRACT

Provided is a method, a computer program product, and a system for providing request messages with zero round trip time in a Transport Layer Security (TLS) session. The method includes establishing a TLS session between a server and a client by performing a TLS handshake between the server and the client. The method further includes generating a session ticket associated to the client. The method also includes transmitting the session ticket to the client and receiving an early request message from the client during the TLS session. The early request message includes a request message that is to be sent to the client upon (Continued)

resuming the TLS session with the client. The method further includes associating the early request message with the session ticket and processing the early request message. The data related to the early request message can be sent upon resumption of the TLS session.

17 Claims, 7 Drawing Sheets

(56) References Cited

U.S. PATENT DOCUMENTS

2018/0316724 A1   11/2018   Reddy et al.
2019/0356694 A1*  11/2019   Wang .................. H04L 63/0281

OTHER PUBLICATIONS

Internet Society Requests for Comment (RFCS), E. Rescorla, "The Transport Layer Security (TLS) Protocol Version 1.3 (RFC 8446)," An IP .com Prior Art Database Technical Disclosure, IP.com No. PCOM000254903D, Aug. 1, 2018 (Electronic Publication Feb. 15, 2019), 161 pages. htttps://ip.com/IPCOM/000254903.

"K54135010: TLS 1.3 0-RTT (early data) feature overview," AskF5, Jul. 12, 2019, 3 pages. https://support.f5.com/csp/article/K54135010.

Fischlin et al., "Replay Attacks on Zero Round-Trip Time: The Case of the TLS 1.3 Handshake Candidates," Feb. 2, 2017, https://eprint.iacr.org/2017/082.pdf.

Strahl, R., "Handling long Web Requests with Asynchronous Request Processing," Code Magazine, Printed: Nov. 22, 2019, 17 pages. https://www.codemag.com/Article/0102091/Handling-long-Web-Requests-with-Asynchronous-Request-Processing.

"6.5.1 Asynchronous operation," GnuTLS 3.6.10 Manual, printed: Nov. 22, 2019, 1 page. https://gnutls.org/manual/html_node/Asynchronous-operation.html.

"6.5.3 Zero-roundtrip mode," GnuTLS 3.6.12, Printed: Mar. 4, 2020, 1 page. https://gnutls.org/manual/html_node/Zero_002droundtrip-modehtml#Zero_002droundtrip-mode.

Mell et al., "The NIST Definition of Cloud Computing", Recommendations of the National Institute of Standards and Technology, Special Publication 800-145, Sep. 2011, 7 pages.

* cited by examiner

ZERO ROUND TRIP TIME TRANSMISSION FOR ANTICIPATORY REQUEST MESSAGES

BACKGROUND

The present disclosure relates to server round trip time, and more specifically, to providing support for an anticipatory request messages over the Transport Level Security (TLS) protocol to reduce communication latency.

Transport layer security (TLS) protocol provides communications security over a computer network. The TLS protocol is useful for applications such as web browsing, email, instant messaging, and voice over IP (VoIP) to secure the communication between a server and a client. The round-trip time (RTT), or round-trip delay time (RTD), refers to the length of time it takes of a signal to travel between a server and a client, plus the length of time it takes for an acknowledgement of that signal to be received. In computer networking, the signal refers to data packets being transmitted from one point to another point.

SUMMARY

Embodiments of the present disclosure include a computer-implemented method for providing request messages with zero round trip time in a TLS session. The computer-implemented method includes establishing a TLS session between a server and a client by performing a TLS handshake between the server and the client. The computer-implemented method further includes generating a session ticket associated to the client. The session ticket can be used to link the client to the TLS session. The computer-implemented method also includes transmitting the session ticket to the client and receiving an early request message from the client during the TLS session. The computer-implemented method further includes associating the early request message with the session ticket and processing the early request message. Processing the early request message can include retrieving data associated with the early request message and storing the data.

Further embodiments of the present disclosure include a computer program product for providing request messages with zero round trip time in a TLS session, which can include a computer readable storage medium having program instruction embodied therewith, the program instruction executable by a processor to cause the processor to perform a method. The method includes establishing a TLS session between a server and a client by performing a TLS handshake between the server and the client. The method further includes generating a session ticket associated to the client. The session ticket can be used to link the client to the TLS session. The method also includes transmitting the session ticket to the client and receiving an early request message from the client during the TLS session. The method further includes associating the early request message with the session ticket and processing the early request message. Processing the early request message can include retrieving data associated with the early request message and storing the data.

Additional embodiments are directed to an anticipatory request message system for providing request messages with zero round trip time in a TLS session and configured to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to server round trip time, and more specifically, to providing support for anticipatory request messages over the Transport Level Security (TLS) protocol to reduce the round-trip time. While the present disclosure is not necessarily limited to such applications, various aspects of the disclosure may be appreciated through a discussion of various examples using this context.

Packets of communication transmitted over a network (e.g., the Internet) can be measured to determine a performance of the transmission. These performance measures include, but are not limited to, bandwidth, throughput, transmission latency, jitter, and error rate. Transmission latency refers to the delay between the sender and the receiver decoding the message. As such, transmission latency can be viewed as a measure of signal travel time and processing time at any node the information traverses. For example, if a web client requests an image from a server, the transmission latency of that request would measure the time it takes for the server to receive the request, retrieve the image, and then transmit the image to the web client.

In some instances, the communication between a web client and a server is secured using the TLS protocol. TLS provides cryptographic protocols designed to provide communications security over a computer network. A server and a web client can establish a TLS connection by exchanging information in adherence with the TLS handshake protocol. The TLS handshake protocol defines the format of messages and the order of their exchange. Once exchanged, the result is a successful TLS connection, in which both the server and the web client can exchange application data securely using the TLS protocol. A successful TLS handshake between a web client and a server that establishes a TLS connection is commonly referred to as a TLS session.

The TLS protocol also provides a means for resuming a TLS session between a web client and a server. This helps to reduce the overhead accrued during the initial TLS handshake. During the initial TLS handshake process, a session ID is generated for the web client. Resumed TLS sessions can be implemented using these session IDs to expedite the TLS connection. However, servers are responsible for remembering the TLS sessions for a predetermined time period. This additional overhead can cause a scalability issue for servers with a large number of concurrent connections.

To address the overhead issues involving session IDs, zero round trip time resumption was introduced. Zero round trip time (0-RTT) resumption mode is a feature introduced in TLS version 1.3 that enables the resumption of a TLS session without needing the client and the server to perform a TLS handshake. To perform this, the 0-RTT protocol resumes a TLS session with a single message sent from a client. A complete TLS handshake is needed for the initial connection between the client and the server. If 0-RTT is supported, the client and the server can generate a resumption secret derived from the session key and session parameters. The resumption secret can then be used to resume the TLS session using only one message.

Limitations on efficiency remain, however, in communication being transmitted between a client and a server via the TLS protocol. Currently, transmission latency remains a factor for large requests made by a client. A request for data that is stored remotely from the server (e.g., the cloud, application server) requires a longer time than data stored directly by the server. The web client is blocked from transmitting data to the server until it receives the information requested in a previous transmission.

Embodiments of the present disclosure may overcome the above, and other problems, by using an anticipatory request message system. The anticipatory request message system includes a web server configured to provide application data and web services, a TLS processor configured to establish a TLS connection between the web server and a client. The TLS processor is also configured to generate a session ticket associated with the client. The anticipatory request message system also includes an early request message transceiver configured to receive at least one early request message from the client during the TLS session. A request message processor is also included in the system and is configured to retrieve data related to the early request messages. Upon receiving an early request from a client, the anticipatory request message system can retrieve data related to the request and store that data until a resumption of the TLS session occurs. Upon receiving a zero round trip travel message from the client to resume the TLS session, the anticipatory request message contents can be transmitted to the client.

More specifically, the anticipatory request message system described herein buffers request messages the client specifies in an early request message. These buffered request messages can include data the client anticipates will be needed in a subsequent TLS session. Utilizing 0-RTT, the anticipatory request message system can immediately transmit the data requested in an early request message upon receiving a resumption message from a client. The transmission latency typically associated with a request message is mitigated by the anticipatory request message system by having early request message buffered and stored. Upon resumption of a TLS session, a web server need not retrieve data from remote locations as the data has already been retrieved. As such, the data can be transmitted immediately to the client once resumption of the TLS session is made.

Request messages can be a type of HTTP message exchanged between a server and a client. Request message can also be any application specific request between a client and a server. For example, an HTTP request message can be through a web browser, while an application specific request message can be from a specific application communicating with a server. The request message is a request sent by a client to trigger an action on the server. Upon receiving a request message from a client, the server performs the action requested and transmits a response message back to the client. Typically, the structure of a request message includes a start-line, HTTP headers, a blank line, and a body. The start-line describes the requests to be implemented, the HTTP headers specify the request, the blank line includes metadata regarding the request, and the body contains data associated with the request. The type of requests included in a request message include, but are not limited to, get, head, post, put, delete, connection, options, trace, and patch.

An early request message refers to a request message that requests an action be performed upon resumption of a TLS session including resumption of a TLS session using 0-RTT and a session ticket that the client intends to use for resumption. The structure of an early request message can be similar to that of a request message and can include any of the request methods possible by a request message. For example, an early request message can include a get method that requests retrieval of a video file. The early request message can be processed similar to that of a request message. However, the response message from the server is halted until the TLS client resumes the session.

By way of example, a web client, via a web browser, sends a request to a server to establish a TLS connection between the client and the server. A TLS server processes the request and establishes a TLS session. Additionally, a session ticket is generated for the client that is associated with the TLS session. The session ticket is then transmitted to the client to allow for a resumption of the TLS session. During the TLS session, the client can transmit an early request message. The early request message can include retrieval of data such as an image file or video file and the session ticket the client intends to use for resumption. The anticipatory request message system receives that message and can retrieve the data requested. The data is then stored by the anticipatory request message system. Upon resumption of the TLS session via 0-RTT using the same session ticket, the anticipatory request message system can transmit the stored data to the web client. By doing so, the transmission latency associated with that request message is negated. This is in due in part because the data requested by the web client may be stored in a remote server. As such, traditionally retrieving the data incurs greater transmission latency because the web server would have to access and retrieve the data from the remote server.

In some embodiments, multiple early request messages are received by the anticipatory request message system. For example, a TLS client can send a first early request message system requesting certain data and the same TLS client can send a second early request message requesting some other data in addition to the earlier request. The second request message can also be associated with the session ticket and processed accordingly. Upon receiving a resumption request containing the session ticket, data from both early request messages can be immediately sent to the TLS client.

In some embodiments, a plurality of session tickets are generated and transmitted a TLS client. Each of the session tickets can be associated with an early request message transmitted by the client. The session tickets can each also be associated with their own early request messages. The anticipatory request message system can transmit each early request message associated with the session tickets received by the TLS client. For example, a TLS client can receive two session tickets from a web server, upon resumption using the first session ticket, the web server can transmit early request messages corresponding to the first session ticket. Upon a second resumption using the second session ticket, the web server can transmit early request messages corresponding to the second session ticket. In another example, a TLS client can receive two session tickets from a web server, upon resumption using the first session ticket, the web server can transmit early request messages corresponding to the first session ticket. Upon a second resumption using the second session ticket, the web server can transmit the same early request message as transmitted in the first resumption.

In some embodiments, data related to early request messages transmitted by a TLS client is stored on local storage by a receiving server. For example, an early request message is transmitted by a TLS client to retrieve an image file. The requested image file can then be retrieved by the server and stored in local storage by the server. Upon receiving a resumption message from the TLS client, the server can then transmit the image file immediately to mitigate the transmission latency associated with retrieving the image file that may be located in a remote server.

Figure 1:
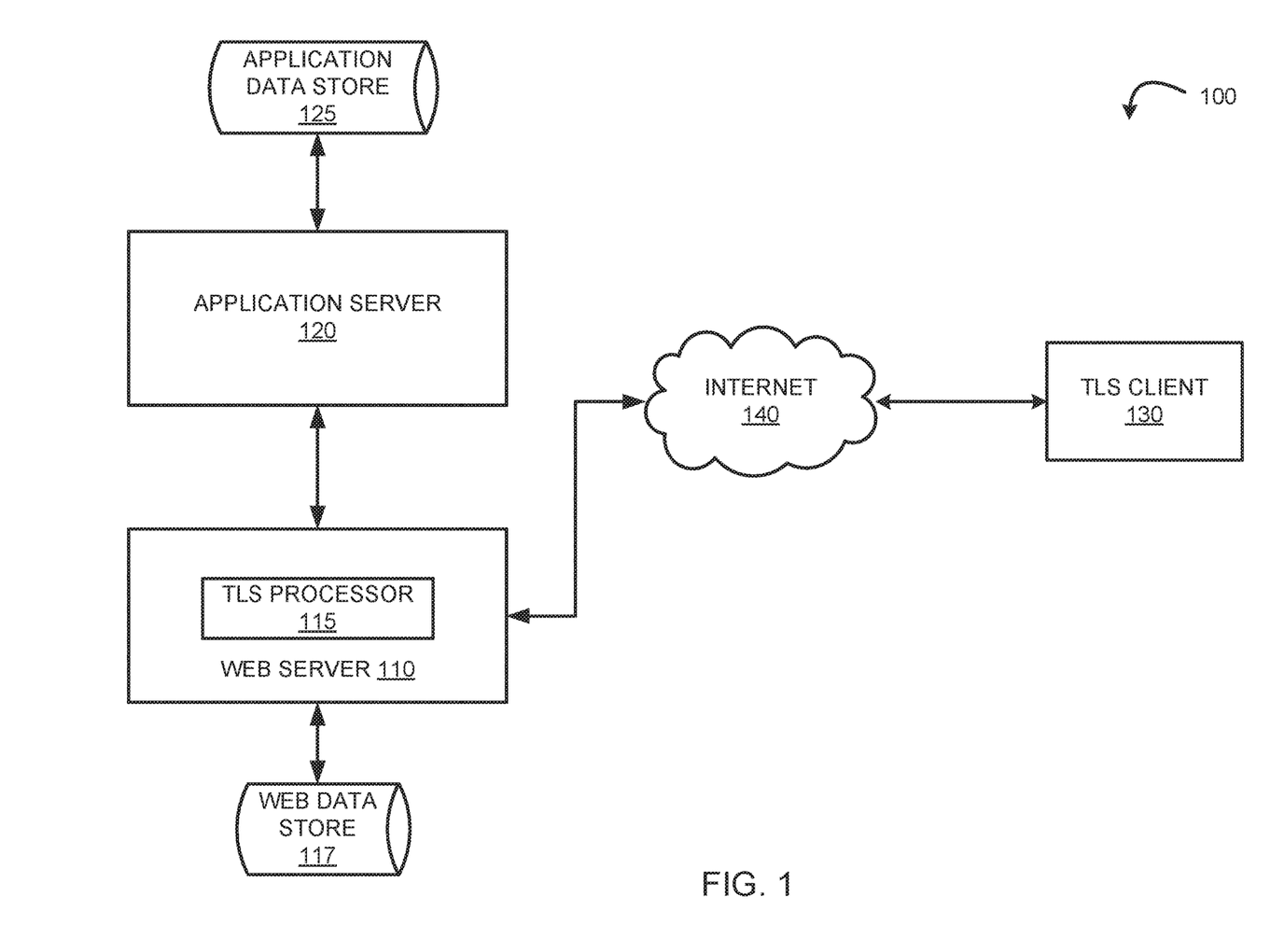
FIG. 1 is a block diagram illustrating an exemplary web environment, in accordance with embodiments of the present disclosure.

Referring now to FIG. 1, shown is a block diagram illustrating an exemplary web environment for providing web services and applications, in accordance with embodiments of the present disclosure. The web environment 100 includes a web server 110, a web data store 117, an application server 120, an application data store 125, a TLS client 130, and the Internet 140. The web server includes a TLS processor 115.

The web server 110 is a component of the web environment 100 configured to respond to client requests made over the World Wide Web (WWW). The web server 110 can process incoming network requests over the Hypertext Transfer Protocol (HTTP) and over related protocols (e.g., SSL, TLS). The web server 110 can be accessed through the domain names of websites and ensures the delivery of the website's content to the requesting client. Additionally, the web server 110 can hold software and other files related to a website. These files include, but are not limited to, Hypertext Markup Language (HTML) documents, images, audio files, video files, and JavaScript files. The web server 110 is connected to the Internet 140 to allow for the requested data to be exchanged with a client.

The web server 110 is further configured to secure connections made with clients using the TLS protocol. TLS includes cryptographic protocols designed to provide communications security over the Internet 140. The web server 110 can utilize the TLS processor 115 to establish a TLS connection between the web server 110 and the TLS client 130. Once established, the web server 110 can transmit encrypted data to the TLS client 130.

The TLS processor 115 is a component of the web server 110 configured to establish a TLS connection between the web server 110 and the TLS client 130, in accordance with embodiments of the present disclosure. The TLS processor 115 performs a TLS handshake between the web server 110 and the TLS client 130 to initiate the TLS connection. A TLS handshake refers to the process of establishing a secure communication between the TLS client 130 and the web server 110. The TLS handshake determines what cipher suite will be used to encrypt the communication, verifies the server, and establishes that a secure connection is in place before beginning actual transfer of data.

To perform the handshake, the TLS processor 115 utilizes TLS Handshake protocol. The TLS Handshake protocol provides the framework and requirements necessary to complete a TLS handshake. The TLS handshake is performed using asymmetric encryption, where a public key and a private key are used. The public key and the private key are considered handshake secrets and are stored by the web server 110 to encrypt and decrypt communication to and from the TLS client 130. The public key is used for encryption and the private key is used for decryption during the TLS handshake process. During the TLS handshake process, the web server 110 and the TLS client 130 utilize the handshake secrets to confidentially set up and exchange a shared key. The shared key can then be used during a TLS session.

As part of the TLS handshake, a cipher suite is negotiated between the web server 110 and the TLS client 130. A cipher suite is a set of algorithms used to secure the connection between the TLS client 130 and the web server 110. Different cipher suites can be used to create the secure connection depending on the configuration of either the web server 110 or the TLS client 130. The cipher suite algorithms can be divided by their functionality. These functionality division include, but are not limited to, key exchange/agreement, authentication, block/stream ciphers, and message authentication. The cipher algorithms used by the functionality divisions include, but are not limited to, Rivest-Shamir-Adleman (RSA), Diffie-Hellman, Elliptic-curve Diffie-Hellman (ECDH), Secure Remote Password Protocol (SRP), pre-shared key (PSK), Digital Signature Algorithm (DSA), Elliptic Curve DSA (ECDSA), RC4, Triple data encryption algorithm (Triple DES), Advanced Encryption Standard (AES), International Data Encryption Algorithm (IDEA), Data Encryption Standard (DES), Camellia, Hash-based MD5, and Secure Hash Algorithms (SHA) hash function.

Additionally, if TLS 1.3 protocol is implemented, all encryption and authentication algorithms are combined in the authenticated encryption with associated data (AEAD) encryption algorithm. Hash algorithms implement Hash-based Message Authentication Code (HMAC) and key derivation function (KDF) known as HKDF.

The TLS processor 115 is further configured to authenticate the web server 110 and the TLS client 130. A negotiation between the TLS client 130 and the server can occur to determine which cipher suite is to be used to and public key infrastructure (PKI) can be used to authenticate either the web server 110 or the TLS client 130. PKI is a set of roles, policies, hardware, software, and procedures needed to create, manage, distribute, use, store and revoke digital certificates and manage public-key encryption. A digital certificate, or identity certificate, is an electronic document used to prove the ownership of a public key. The digital certificate can be used to provide information about the identity of its owner and the digital signature of an entity that has verified the certificate's contents. If the signature is valid, and the software examining the certificate trusts the issuer, then it can use the public key to communicate securely with the owner of the certificate.

The TLS processor 115 is further configured to calculate connection secrets, such as a master secret key. A client key exchange message can be sent to the TLS client 130 to allow for the generation of a pre-master key. A pre-master secret can be created by the TLS client 130 and then shared with the web server 110. The TLS processor 115 can decrypt the pre-master secret and use that secret to compute a master secret key. The master secret key can be up to 48 bytes in length and is used by both the TLS client 130 and the web server 110 to symmetrically encrypt data during a TLS session.

The TLS processor 115 is further configured to reestablish a secure connection with the TLS client 130 using 0-RTT protocols. The 0-RTT protocol allow for the establishment of a secure connection with a single message sent from the TLS client 130 to the web server 110. This provides a means for the TLS client 130 to send a cryptographically protected message along with a key establishment message without the need of performing the handshake protocol. As such, transmission latency is reduced which can improve the performance of applications with low-latency requirements.

The resumption of a TLS connection using 0-RTT protocols requires the TLS processor 115 to first establish a TLS connection with the TLS client 130 using TLS version 1.3. Both the web server 110 and the TLS client 130 can derive a resumption secret from the shared key, or master key, and the session parameters. Upon receiving a resumption request from the TLS client 130, the TLS processor 130 can utilize session caches or session tickets. For session caches, the web server 110 stores the resumption secrets of recent sessions in the web data store 117 and issues each client a lookup key. The lookup key can enable the web server 110 to retrieve and use the matching resumption secret. For session tickets, the web server 110 uses a Session Ticket Encryption Key (STEK) which is a long-term symmetric encryption key. The TLS processor 115 can utilize the STEK to encrypt the resumption secret to create the session ticket. Once created, the session ticket can be transmitted to the TLS client 130 so that it can be used in a 0-RTT message to resume its TLS session.

The application server 120 is a component of the web environment 100 configured to allow for the creation of web applications and provides the infrastructure to execute web applications, in accordance with embodiments of the present disclosure. The application server 120 can provide system software upon which web applications and desktop application to run on. The application server 120 includes, but is not limited to, web server connectors, computer programming languages, runtime libraries, database connectors, and code configurations to connect to the web server 110. Information relating to the application server 120, such as application data, files, configurations, and the like can be stored on the application data store 125.

The TLS client 130 is a component of the web environment 100 configured to communicate to a server using the TLS protocol, in accordance with embodiments of the present disclosure. The TLS client 130 can be a web client communicating securely with a server during a TLS session. In some embodiments, the TLS client is a web browser configured to receive user input. The web browser may contain dynamic Web pages operating in a Web tier. In some embodiments, the TLS client 130 is a server (e.g., WINDOWS, Power Systems, IBM I, UNIX, System Z), a personal computer (e.g., desktop, laptop, tablet), or any device capable of communicating over a network and securely connecting to the web server 110 using the TLS protocol.

The Internet 140 is a component of the web environment 100 that includes a global system of interconnected computer networks and devices that use common communication protocols, such as the transmission control protocol (TCP), user datagram protocol (UDP), and the internet protocol (IP) in the TCP/IP internet protocol suite. Internet access is typically provided by Internet service providers delivering connectivity via various networking technologies.

It is noted that FIG. 1 is intended to depict the representative major components of an exemplary web environment 100. In some embodiments, however, individual components may have greater or less complexity than as represented in FIG. 1, components other than or in addition to those shown in FIG. 1 may be present, and the number, type, and configuration of such components may vary.

Figure 2:
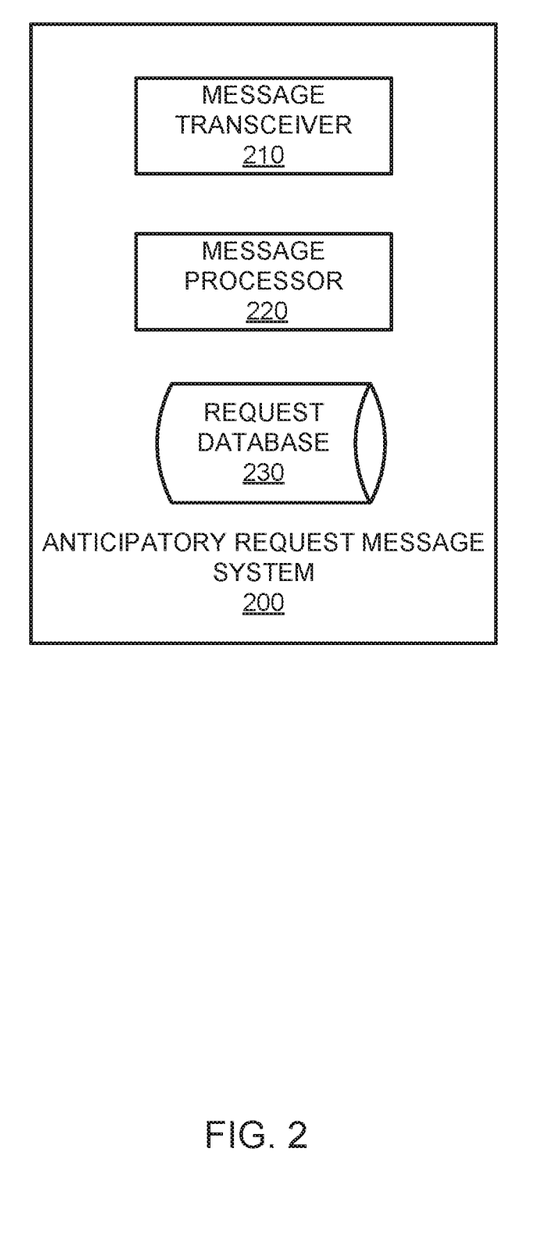
FIG. 2 is a block diagram illustrating an anticipatory request message system, in accordance with embodiments of the present disclosure.

FIG. 2 is a block diagram illustrating an anticipatory request message system 200, in accordance with embodiments of the present disclosure. The anticipatory request message system 200 includes a message transceiver 210, a message processor 220, and a request database 230. In some embodiments, the anticipatory request message system 200 operates as a component of a web server, which may be the same as, or similar to, the web server 110 of FIG. 1. To illustrate the anticipatory request message system 200, but not to limit embodiments, FIG. 2 is described within the context of the web environment 100 of FIG. 1.

The message transceiver 210 is a component of the anticipatory request message system 200 configured to receive early request messages transmitted to the web server 110, in accordance with embodiments of the present disclosure. For example, the TLS client 130 can transmit an early request message to the web server 110 requesting an image file. The message transceiver 210 can receive the request and associate the early request message with the session ticket provided to the TLS client 130.

The message transceiver 210 is further configured to transmit the data requested in the early request message upon receiving a resumption message. The message transceiver 210 can retrieve the data which may be stored on a local storage drive such as the web data store 117 and transmit the data to the TLS client 130. For example, a TLS client 130 transmits a 0-RTT resumption message to a web server 110. Contained within the 0-RTT resumption message is a session ticket the web server 110 provided to the TLS client 130 in a previous TLS session. The message transceiver 210 can search a request database 230 to determine whether the session ticket has an early request message associated with it. If found, the message transceiver 210 can transmit the data requested by the early request message to the TLS client 130.

The message processor 220 is a component of the anticipatory request message system 200 configured to retrieve data requested by the early request message system, in accordance with embodiments of the present disclosure. An early request message can include requests for data located remotely from the web server 110. For example, the data may be located in an application data store 125 associated with an application server 120. The data can also be located in some other remote server which may require the message processor 220 to retrieve the data over the Internet 140. The message processor 220 is further configured to store the retrieved data on a local storage unit of the web server 110, such as the web data store 117.

The message processor 220 is further configured to make entries into the request database 230 regarding early request message and session tickets. The entries can then be used to associate early request messages with session tickets. For example, a TLS client 130 can transmit a 0-RTT resumption message including a session ticket. The session ticket can be used to search the request database 230 to determine which, if any, early request messages are associated with that session ticket. If located, the data requested by those early request messages can be retrieved and transmitted in a response back to the TLS client.

In some embodiments, the entries into the request database 230 include a time limit. For example, if the web server 110 does not receive a 0-RTT resumption message from the TLS client 130 within a predetermined amount of time (e.g., one hour, one day, one week) then the data retrieved for the early request message is deleted and the entry removed from the request database 230. This allows for the prevention of over-loading the web server 110 with early request messages that may or may not be fulfilled.

The request database 230 is a component of the anticipatory request message system 200 configured to store entries relating to early request messages received by a web server 110, in accordance with embodiment of the present disclosure. While shown in FIG. 2 as a database, the request database 230 can be a table, a database, a journal, or metadata internally stored within the anticipatory request message system 200. The request database 230 can include session ticket information corresponding to early request messages. In some embodiments, the request database can store a plurality of early request messages pertaining to a session ticket. For example, one session ticket can be tied to three different early request messages. In some embodiments, the request database stores a plurality of session tickets that correspond to at least one early request message. For example, two session tickets can correspond to a single early request message. If either session ticket is received by the anticipatory request message system 200, the corresponding early request message can be retrieved.

It is noted that FIG. 2 is intended to depict the representative major components of an anticipatory request message system 200. In some embodiments, however, individual components may have greater or less complexity than as represented in FIG. 2, components other than or in addition to those shown in FIG. 2 may be present, and the number, type, and configuration of such components may vary.

Figure 3:
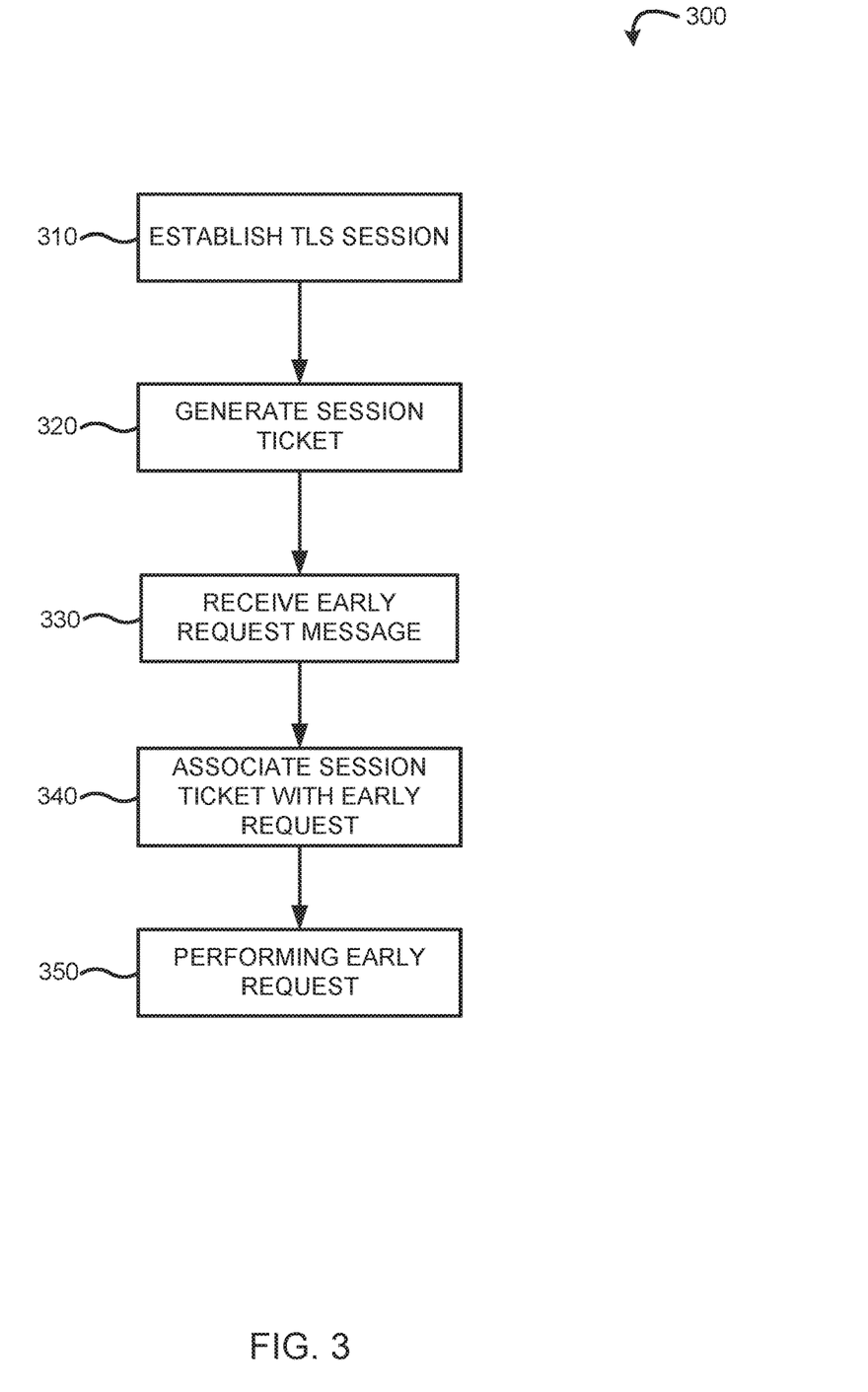
FIG. 3 is a flow chart of a request message process, in accordance with embodiments of the present disclosure.

FIG. 3 is a flow diagram illustrating a process 300 for processing early request messages sent by a TLS client to a web server, in accordance with embodiments of the present disclosure. The process 300 may be performed by hardware, firmware, software executing on at least one processor, or any combination thereof. For example, any or all of the steps of the process 300 may be performed by one or more computing devices (e.g., computer system 500 of FIG. 5). To illustrate process 300, but not to limit embodiments, FIG. 3 is described within the context of web environment 100 of FIG. 1 and anticipatory request message system 200 of FIG. 2. Where elements described with respect to FIG. 3 are identical to elements shown in FIGS. 1 and 2, the same reference numbers are used in both Figures.

The process 300 begins by establishing a TLS session between a TLS client 130 and a web server 110. This is illustrated at step 310. The TLS client 130 can query the web server 110 to request the establishment of a TLS connection. The TLS connection request includes, but is not limited to, a client version, a client random, a session ID, compression methods, cipher suites, and extensions. The TLS client 130 includes in the client version a list of all the TLS protocol versions that it supports as well as a preferred protocol version. For example, the TLS client 130 can include each TLS version it supports (e.g., TLS 1.0, 1.1, 1.2, 1.3, etc.). The client random is a 32-byte random number. The client random and a server random are later used to generate the key for encryption. The session ID is used once a TLS session has been configured. The web server 110 can search previously cached sessions and resume that session if a match is found. Compression methods are the compression techniques the TLS client 130 is capable of for compressing TLS packets. By using compression, lower bandwidth usage can be achieved. Similar to the compression methods, the cipher suite is a list of cryptographic algorithms the TLS client 130 is capable of. The cryptographic algorithms can be used to encrypt key exchanges, authentication, data encryption, and message authentication.

To establish a TLS connection, the TLS processor 115 can reply to the request sent from the TLS client 130 with a message providing the server's information. This information includes, but is not limited to, the server version, the server random, the session ID if located, cipher suites, and compression methods. The server version informs the TLS client 130 as to which protocol version it will use from the list provided. The server random is a 32-byte random number used to generate the encryption key. The cipher suites are a selection from the cipher suites offered by the TLS client 130, and the compression method is a selection of compression method offered by the TLS client 130.

The TLS processor 115 transmits the server certificate proving the identity of the server to the client. Also contained within the message is the public key of the server. Once the server certificate is sent, a server hello done message is sent followed by receiving a client key exchange message. The TLS processor 115 can then receive a pre-master secret from the TLS client 130. Prior to sending the pre-master secret, the TLS client 130 encrypts it using the server public key provided from the server certificate.

The TLS processor 115 can proceed by computing a master secret key, based on the client random and the server random value exchanged earlier. Typically, a master secret key is 48 bytes in length and used by the server and client to symmetrically encrypt the data for the rest of the communication. Once the master secret key is computed, a TLS session is established. Also, a resumption secret can be computed using the master secret key and the TLS session parameters.

The message transceiver 210 generates a session ticket relating to the TLS connection established between the web server 110 and the TLS client 130. This is illustrated at step 320. Utilizing a STEK key stored by the web server 110 and the resumption secret, the TLS processor 115 can generate the session ticket and transmit the session ticket to the TLS client 130.

In some embodiments, a session cache is generated in place of a session ticket. The session cache is generated and stored by the web server 110 for the TLS session with the TLS client 130. The web server 110 can create a look up key that references the session cache and can provide the lookup key to the TLS client 130.

In some embodiments, the TLS session ID, generated during the TLS handshake process, is used in place of the session ticket. A TLS session ID is generated to allow for resumption of an encrypted session. When the TLS client 130 reconnects with the web server 110 using a session ID, the web server 110 can look up the session IDs and resume the encrypted communication if the provided session ID matches with a session ID stored by the web server 110.

The message transceiver 210 receives an early request message from the TLS client 130 during the TLS session. This is illustrated at step 330. The early request message can include requests made by the TLS client 130 that can be responded to upon resumption of the TLS session and the session ticket that the TLS client intends to use in future resumptions. For example, the TLS client 130 can request a document from the web server 110. The document can be retrieved by the web server 110 and stored until the TLS client 130 transmit a resumption message with the same session ticket to the web server 110.

The message processor 220 associates the early request message with the session ticket provided to the TLS client 130. This is illustrated at step 340. Once received, the message processor 220 can associate the session ticket generated for the TLS client 130 that transmitted the early request message and log that association in the request database 230. This allows the message transceiver 210 to look up the appropriate response when receiving a resumption message.

The message processor 220 performs the actions requested by early request message. This is illustrated at step 350. The early request message can include several requested actions as well as retrieval of data including documents, images, audio files, and video files. The message processor 220 can perform the actions and retrieve any data that was requested. The retrieved data can then be stored in the web data store 117. As opposed to a regular request message, the web server 110 does not give a response back to the TLS client 130. The data is stored until the TLS client resumes a later TLS session.

Figure 4:
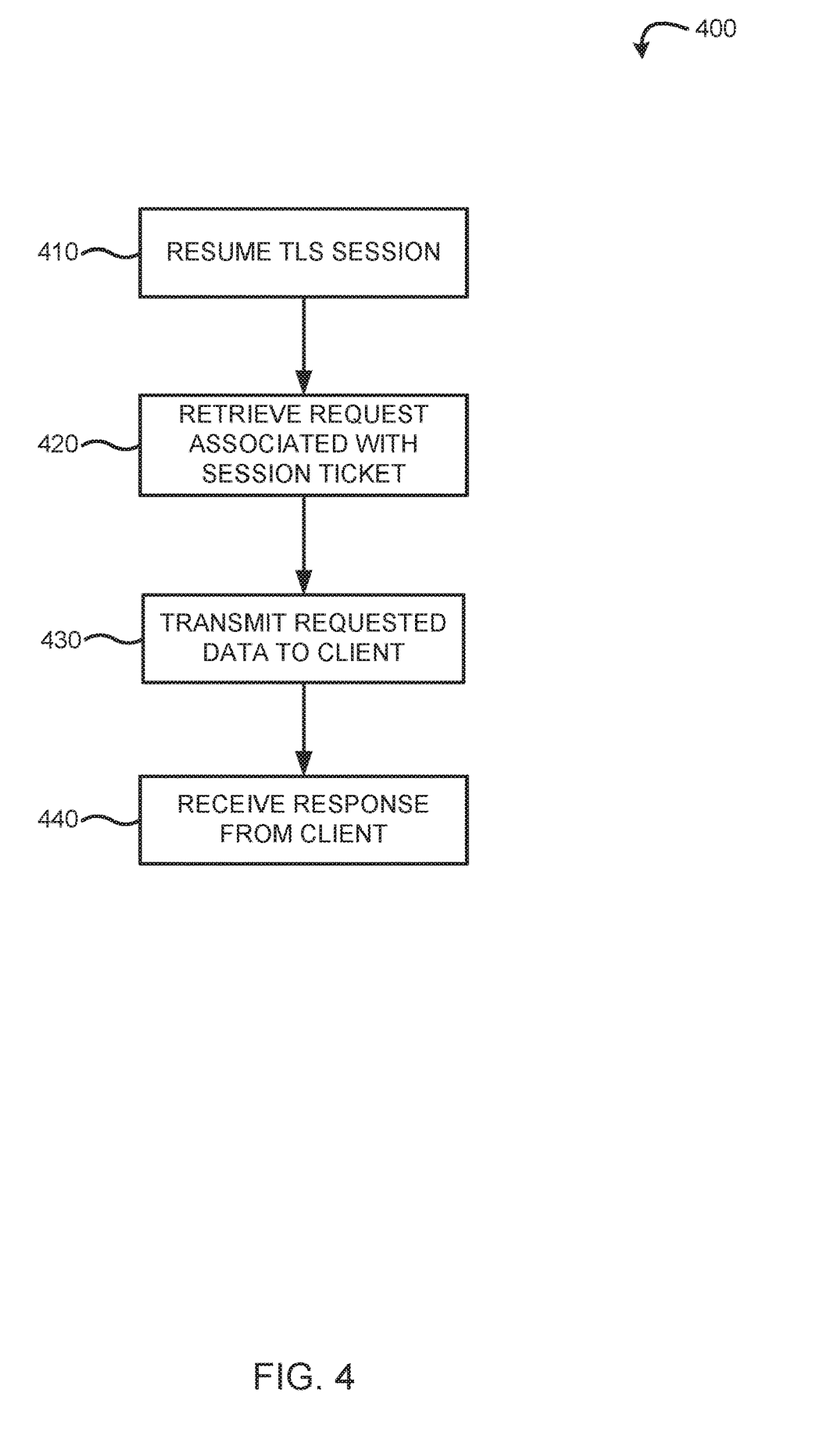
FIG. 4 is a flow chart of a request message resumption process, in accordance with embodiments of the present disclosure.

FIG. 4 is a flow diagram illustrating a process 400 for retrieving early request messages sent by a TLS client to a web server, in accordance with embodiments of the present disclosure. The process 400 may be performed by hardware, firmware, software executing on at least one processor, or any combination thereof. For example, any or all of the steps of the process 400 may be performed by one or more computing devices (e.g., computer system 500 of FIG. 5). To illustrate process 400, but not to limit embodiments, FIG. 4 is described within the context of web environment 100 of FIG. 1 and anticipatory request message system 200 of FIG. 2.

The TLS processor 115 resumes the TLS session between the web server 110 and the TLS client 130. This is illustrated at step 410. The resumption of the TLS session can be performed when a 0-RTT resumption message is received by the web server 110. The 0-RTT resumption message includes the session ticket generated in the previous TLS session. The session ticket authenticates the TLS client 130 to allow for the resumption of the TLS session with only one message being sent. The message processor 220 can utilize the session ticket to further search the request database 230 for possible early request messages previously transmitted by the TLS client 130.

The message processor 220 retrieves the early request messages associated with the session ticket provided in the 0-RTT message. This is illustrated at step 420. In some embodiments, more than one early request message is associated with the session ticket and those early request messages are retrieved. In some embodiments, a plurality of session tickets are received and all of the early request messages associated with any of the session tickets received are retrieved. Additionally, the message processor 220 can evaluate the early request messages for actions that requested retrieval of data. The request database 230 can be accessed and the data retrieved.

The data relating to the early request messages is transmitted to the TLS client 130. This is illustrated at step 430. The data can be sent in a 0-RTT transmission message that acknowledges the resumption of the TLS session between the TLS client 130 and the web server 110. A response back from the TLS client 130 is received confirming the transmission. This is illustrated at step 440. In some embodiments, the response from the TLS client 130 includes additional early request messages intended for a subsequent TLS session. The session ticket provided to the TLS client 130 can continue to be used or the web server 110 can generate a new session ticket using the STEK key and the session parameters of the current TLS session.

Figure 5:
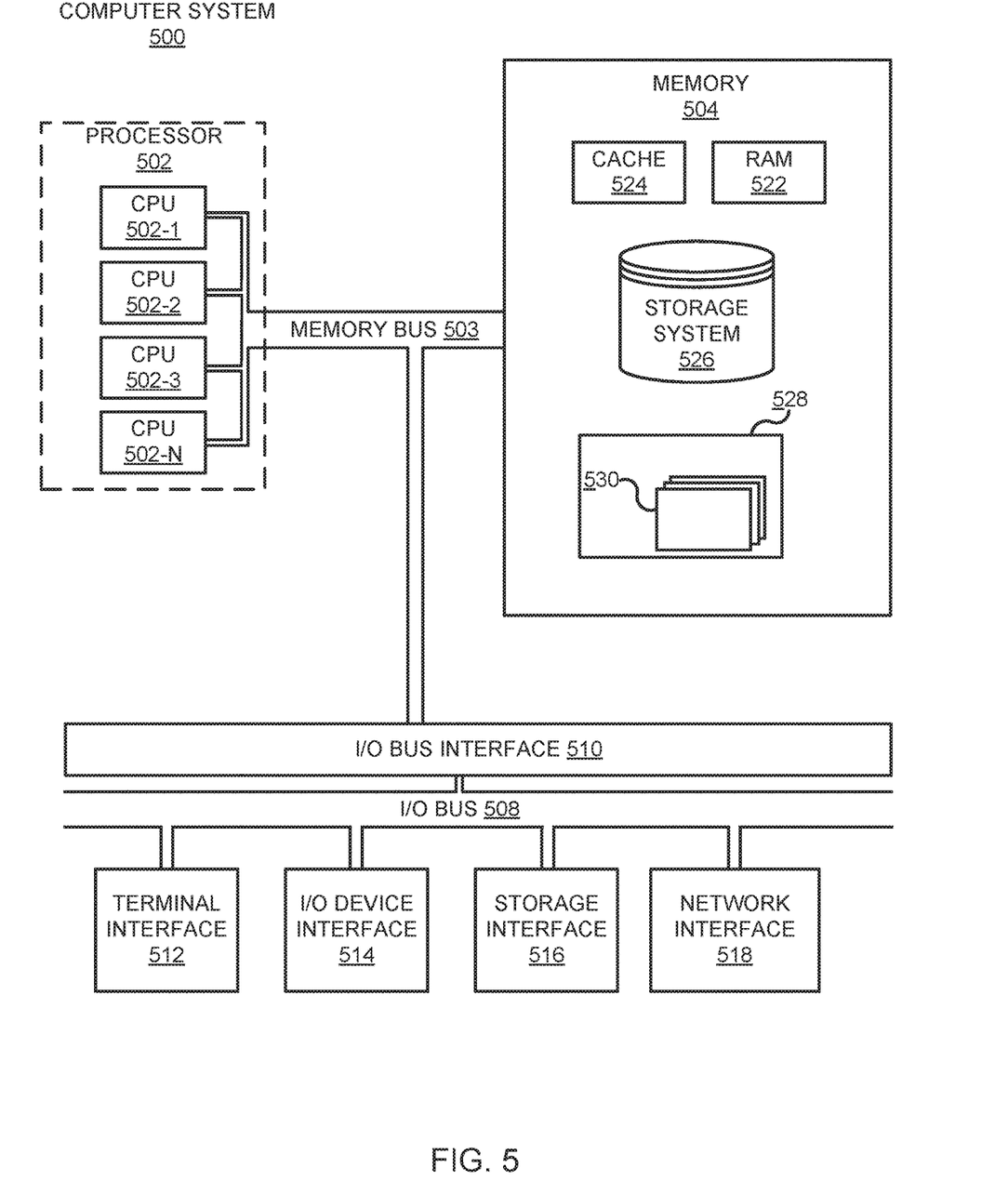
FIG. 5 is a high-level block diagram illustrating an example computer system that may be used in implementing one or more of the methods, tools, and modules, and any related functions, described herein, in accordance with embodiments of the present disclosure.

Referring now to FIG. 5, shown is a high-level block diagram of an example computer system 500 (e.g., the anticipatory request message system 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, a I/O (Input/Output) device interface 514, a storage interface 516, and a network interface 518, all of which may be communicatively coupled, directly or indirectly, for inter-component communication via a memory bus 503, a I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments the computer system 500 may alternatively be a single CPU system. Each processor 501 may execute instructions stored in the memory 504 and may include one or more levels of on-board cache.

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
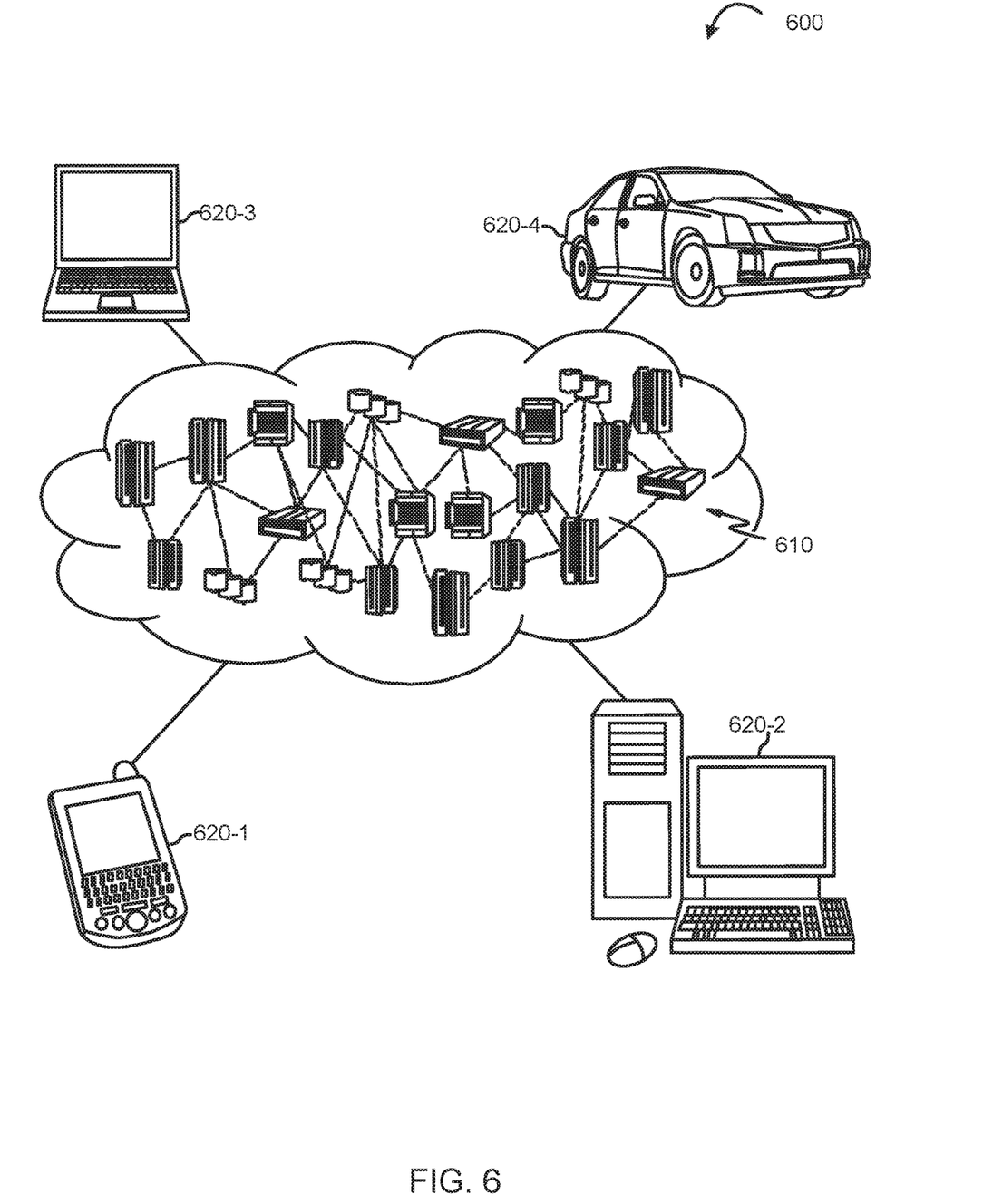
FIG. 6 depicts a cloud computing environment, in accordance with embodiments of the present disclosure.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1 to 620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
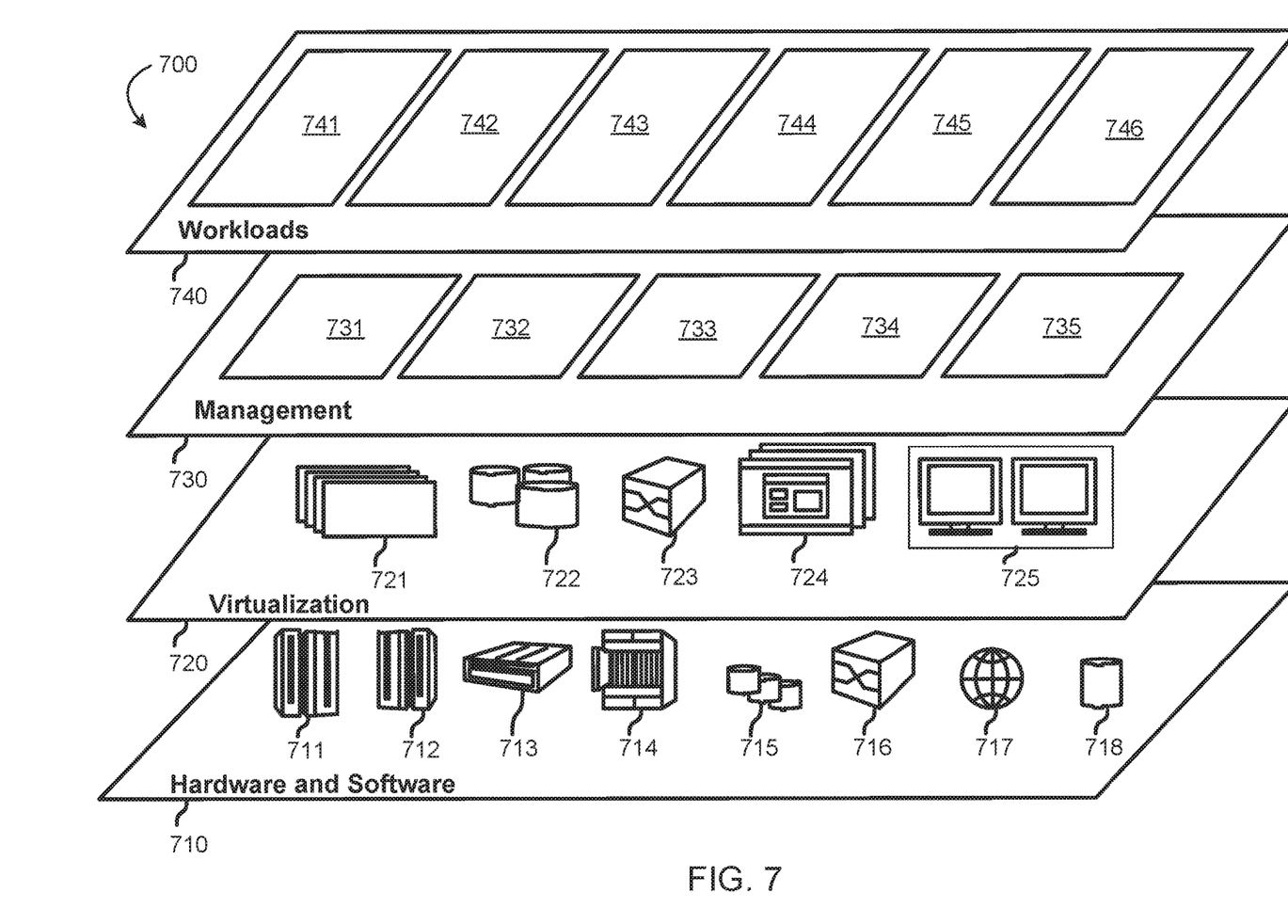
FIG. 7 depicts abstraction model layers, in accordance with embodiments of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 include hardware and software components. Examples of hardware components include: mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include: mapping and navigation 741; software development and lifecycle management 742; virtual classroom education delivery 743; data analytics processing 744; transaction processing 745; and precision cohort analytics 746 (e.g., the anticipatory request message system 200).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   establishing a TLS session between a server and a client by performing a TLS handshake between the server and the client;
   generating a session ticket associated with the client by encrypting session parameters relating to the TLS session using a session ticket encryption key (STEK), the session ticket being usable for resumption of the TLS session;
   transmitting the session ticket to the client;
   receiving an early request message and the session ticket from the client during the TLS session, wherein the early request message includes an action for data to be sent to the client upon resuming the TLS session with the client;
   associating the early request message with the session ticket;
   processing the early request message by performing the action stated within the early request message;
   receiving a zero round trip time resumption message from the client requesting to resume the TLS session, wherein the zero round trip time resumption message includes the session ticket;
   retrieving the early request message associated with the session ticket; and
   transmitting the data relating to the early request message in a zero round trip time transmission to the client.

2. The computer-implemented method of claim 1, further comprising:
   receiving an early response from the client indicating a reception of the data relating to the early request message.

3. The computer-implemented method of claim 1, wherein a plurality of session tickets are transmitted to the client with each of the session tickets being associated with the client.

4. The computer-implemented method of claim 1, further comprising:
   receiving a second early request message from the client during the TLS session, wherein the second early request message contains a second request message;
   associating the second early request message with the session ticket; and
   processing the second early request message by performing a second action stated within the second early request message.

5. The computer-implemented method of claim 1, wherein a session ID generated during the TLS handshake is used in place of the session ticket for resumption.

6. The computer-implemented method of claim 1, further comprising:
   storing the data relating to the early request message on a local storage of the server.

7. A computer program product comprising a computer readable medium having program instructions embodied therewith, the program instructions being executable by a processor to cause the processor to perform a method, the method comprising:

establishing a TLS session between a server and a client by performing a TLS handshake between the server and the client;

generating a session ticket associated with the client by encrypting session parameters relating to the TLS session using a session ticket encryption key (STEK), the session ticket being usable for resumption of the TLS session;

transmitting the session ticket to the client;

receiving an early request message and the session ticket from the client during the TLS session, wherein the early request message includes an action for data to be sent to the client upon resuming the TLS session with the client;

associating the early request message with the session ticket;

processing the early request message by performing the action stated within the early request message;

receiving a zero round trip time resumption message from the client requesting to resume the TLS session, wherein the zero round trip time resumption message includes the session ticket;

retrieving the early request message associated with the session ticket; and     transmitting the data relating to the early request message in a zero round trip time transmission to the client.

8. The computer program product of claim 7, further comprising:

receiving an early response from the client indicating a reception of the data relating to the early request message.

9. The computer program product of claim 7, wherein a plurality of session tickets are transmitted to the client with each of the session tickets being associated with the client.

10. The computer program product of claim 7, further comprising:

receiving a second early request message from the client during the TLS session, wherein the second early request message contains a second request message;

associating the second early request message with the session ticket; and     processing the second early request message by performing a second action stated within the second early request message.

11. The computer program product of claim 7, wherein a session ID generated during the TLS handshake is used in place of the session ticket for resumption.

12. The computer program product of claim 7, further comprising:

storing the data relating to the early request message on a local storage of the server.

13. An anticipatory request message system, the anticipatory request message system comprising:

at least one processor;

at least one memory component;

a web server configured to provide application data and web services;

a TLS server configured to establish a TLS connection between the web server and a client, the TLS server further configured to generate a session ticket associated with the client;

a message transceiver configured to receive at least one early request message from the client during a TLS session;

a message processor configured to retrieve data requested by the early request messages; and     a request database configured to store the session ticket and the early request message associated with the client.

14. The anticipatory request message system of claim 13, wherein the TLS server is further configured to transmit the data to the client upon resuming the TLS session in a zero round trip travel transmission.

15. The anticipatory request message system of claim 13, wherein the message processor is configured to store the data requested by the early request message in a local storage accessible by the web server.

16. The anticipatory request message system of claim 13, wherein the TLS server is further configured to generate a plurality of session tickets associated with the client.

17. The anticipatory request message system of claim 13, wherein the TLS server is further configured to use a session ID in place of the session ticket, the session ID being created when establishing the TLS connection, wherein the session ID is usable for one resumption.

\* \* \* \* \*